United States Patent
Orita et al.

[11] Patent Number: 6,019,127
[45] Date of Patent: Feb. 1, 2000

[54] STRUCTURE FOR CONNECTING FILLER TUBE TO FUEL TANK

[75] Inventors: Kei Orita; Junichi Hanai, both of Kanagawa-ken, Japan

[73] Assignee: Nissan Motor Co., Ltd., Kanagawa-ken, Japan

[21] Appl. No.: 08/956,587

[22] Filed: Oct. 23, 1997

[30] Foreign Application Priority Data

Oct. 23, 1996 [JP] Japan .................................. 8-280987

[51] Int. Cl.⁷ .................................................. F16K 15/03
[52] U.S. Cl. ...................................... 137/515.7; 137/592
[58] Field of Search ............................ 137/515.7, 515.5, 137/587, 588, 590, 592

[56] References Cited

U.S. PATENT DOCUMENTS

| | | | |
|---|---|---|---|
| 996,099 | 6/1911 | Leidecker | 137/515.7 |
| 2,206,356 | 7/1940 | Hutchings | 137/515.7 |
| 2,355,683 | 8/1944 | Sharp | 137/515.7 |
| 2,655,178 | 10/1953 | Sarosdy | 137/592 X |
| 3,911,949 | 10/1975 | Hilden et al. | 137/592 X |
| 4,022,245 | 5/1977 | Davis | 137/515.7 X |
| 4,776,369 | 10/1988 | Lardner et al. | 137/515.5 |
| 4,974,645 | 12/1990 | Johnson | 137/587 X |
| 5,282,497 | 2/1994 | Allison | 137/588 |
| 5,327,871 | 7/1994 | Gryc | 137/590 X |
| 5,660,206 | 8/1997 | Neal et al. | 137/592 |

*Primary Examiner*—John Rivell
*Attorney, Agent, or Firm*—McDermott, Will & Emery

[57] ABSTRACT

An inner diameter of a filler tube is formed smaller than that of a filler neck of a tank main body. Hence, a clearance is thus difficult to be created between inner peripheral surface of the filler tube and the fuel stream which flows through the filler tube upon supply of fuel, and also leakage of vapor fuel from a fuel filler port can be avoided. In addition, a cylindrical insert whose inner diameter is formed to be substantially equal to its of the filler tube is provided in a neck portion of the filler hose. Accordingly, there exists no portion where the inner diameter is largely changed in the filler neck portion, whereby generation of turbulent flow of the supplied fuel and reduction in a flow rate can be suppressed to their maximum and thus fuel supply performance can be enhanced.

10 Claims, 1 Drawing Sheet

FIGURE
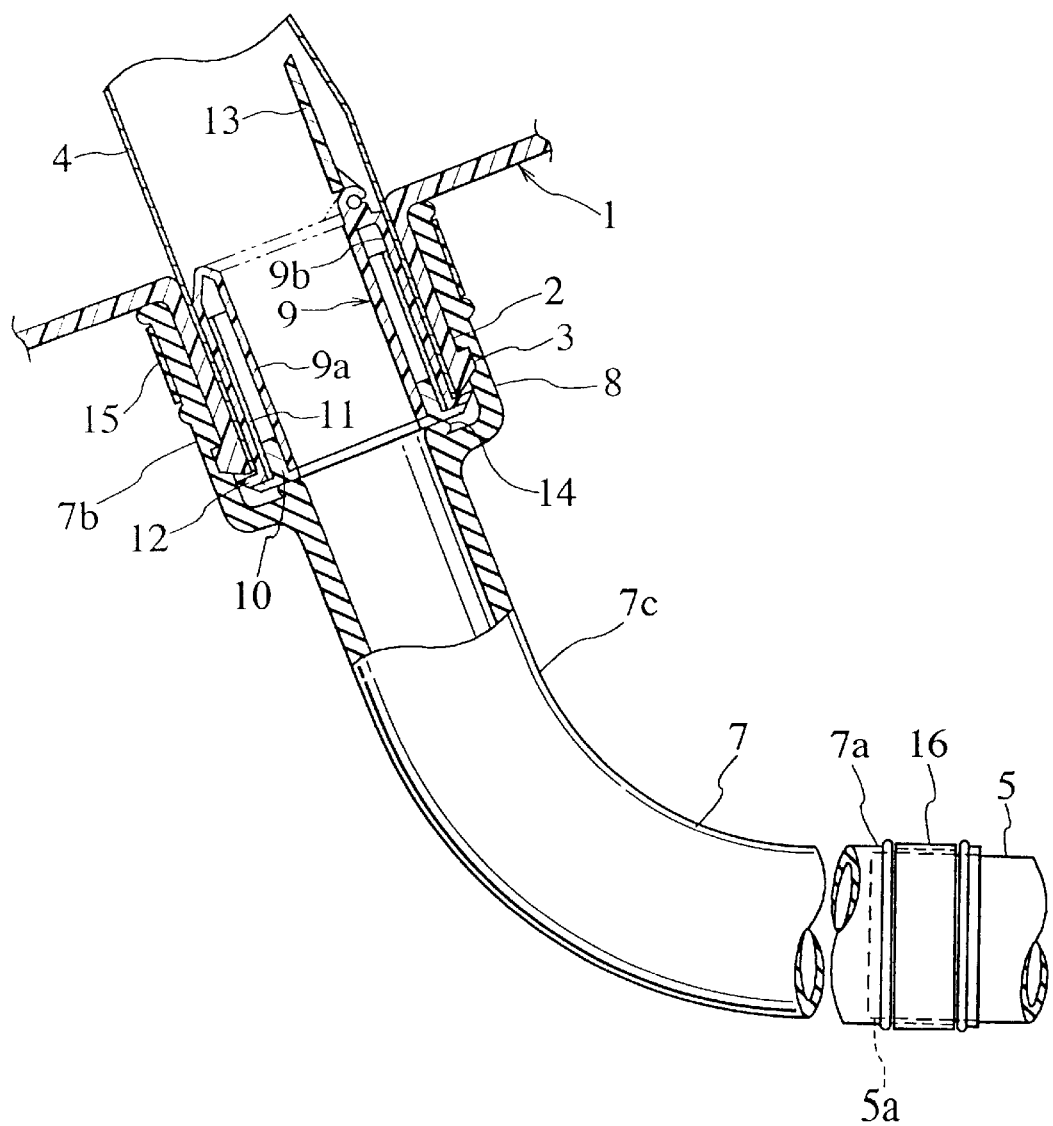

STRUCTURE FOR CONNECTING FILLER TUBE TO FUEL TANK

The contents of Application No. TOKUGANHEI 8-280987 filed Oct. 23, 1996, in Japan is hereby incorporated by reference.

BACKGROUND OF THE INVENTION

The present invention relates to a structure for connecting a filler tube to a fuel tank which is installed in an automobile.

In general, a flexible filler hose has been utilized as a member for connecting a main tube body of the filler tube to the fuel tank in the automobile. Such filler hose is made of rubber, resin, etc. which has oil resistance, heat resistance, and weatherability. When the fuel tank and the main tube body are displaced relatively due to vibrations during running of the automobile, collision of the automobile, etc., such displacement can be absorbed by flexible deformation of the filler hose. Normally the fuel tank is formed of resin by use of blow molding.

SUMMARY OF THE INVENTION

In the meanwhile, in order to prevent air pollution, it is desirable that the fuel which evaporates from a fuel filler port and thus flows out of the fuel tank must be suppressed as little as possible when such fuel is supplied. In order to suppress such evaporated fuel (i.e., vapor fuel), inner diameters of the main tube body and the filler hose must be formed as small as possible not to create a clearance between inner peripheral surfaces of the main tube body and the filler hose and a fuel stream which flows through the main tube body and the filler hose.

On the contrary, if a tank main body is formed by virtue of blow molding, it is difficult to form the filler neck of the tank main body with a small inner diameter. The filler hose is connected to the tank main body. Therefore, the inner diameter of the filler neck is formed inevitably large to some extent.

Accordingly, in the above configuration to suppress the vapor fuel, the inner diameters of the main tube body and the filler hose are formed small rather than the inner diameter of the filler neck. As a result, change in inner diameter along a fuel supply passage (i.e., inner diameter change portion) is caused in the filler neck.

However, because of such inner diameter change portion in the fuel supply passage, turbulent flow of the supplied fuel is generated in the inner diameter change portion to thus reduce a flow rate of the fuel, which results in degradation in fuel supply performance. Consequently, in the prior art, it has been difficult to attain compatibly both prevention of the air pollution and improvement in the fuel supply performance.

Therefore, it is an object of the present invention to provide a structure for connecting a filler tube to a fuel tank, which is capable of aiming at prevention of air pollution upon supplying fuel and also improvement in fuel supply performance compatibly.

In order to achieve the above object, the present invention comprises a filler neck, a filler tube, and an insert member. The filler neck is formed in a tubular shape and projected from an outer surface of a tank main body. The filler neck connects an inside of the tank main body to an outside thereof and has an inner diameter which is larger than an inner diameter of the filler tube. The filler tube includes a connection portion on one end of the filler tube fitted onto an outer peripheral surface of the filler neck. The insert member is disposed in the filler neck and includes a fuel flow passage connecting the filler tube to the tank main body and having an inner diameter substantially identical to the inner diameter of the filler tube.

The filler tube may include a main tube body and a filler hose. The filler hose comprises a tube portion having an inner diameter substantially identical to the inner diameter of the main tube body, first connection portion on one end of the tube portion connected to the main tube body and second connection portion on the other end of the tube portion fitted onto an outer peripheral surface of the filler neck.

With the above configuration, inner diameter of the main tube body and filler hose are formed to be substantially identical to each other but smaller than that of the filler neck. In other words, the inner diameter of the filler tube can be set to a desired dimension which can make it difficult to generate a clearance between its inner peripheral surface and the fuel stream which flows through the filler tube upon supply of the fuel. As a result, it is possible to avoid leakage of the vapor fuel out of the fuel filler port.

With the use of the insert member, a portion where a dimension of the inner diameter is largely changed can be eliminated from the fuel flow passage, so that the inner diameters from the filler tube to the filler neck can be substantially identical. Accordingly, both generation of turbulent flow of the supplied fuel and reduction in the flow rate can be suppressed to their maximum and also fuel supply performance can be improved.

The insert member may include a main body and a collar. The main body is formed of resin and includes an inner peripheral wall and an outer peripheral wall. The inner surface of the inner peripheral wall defines the fuel flow passage. The outer peripheral wall is provided along an outer surface of the inner peripheral wall at a distance therefrom. The collar is formed of metal and inserted into a cylindrical clearance between the inner peripheral wall and the outer peripheral wall so as to be positioned along an inner surface of the outer peripheral wall at a distance from the inner peripheral wall.

In the above configuration, the insert member is made of resin and has a hollow structure with the cylindrical clearance between the inner peripheral wall and the outer peripheral wall. Thus, a weight of the insert member can be reduced lighter. As a consequence, handling of such insert member becomes easier upon assembly and management as parts and in addition the insert member becomes advantageous in cost.

The metal collar is placed along the inner surface of the outer peripheral wall at a distance from the inner peripheral wall which contacts to the fuel. Hence, the insert member can be reinforced by the metal collar, nevertheless change in shape (i.e., deformation) of the insert member is in no way limited by the metal collar when the insert member is expanded due to fuel swelling.

In addition, the second connection portion of the filler hose may include a neck portion and an annular rib. The neck portion is extended outward from an outer peripheral surface of the other end of the tube portion. The filler neck is fitted onto an inner peripheral surface of the neck portion. The annular rib is integrally projected from the other end of the tube portion to an inner side of the neck portion. The annular rib is positioned to be brought into tight contact with a peripheral portion of an inlet of said insert In the above configuration, variation in relative position between the insert member and the end portion of the tube portion in the neck portion can be absorbed by the cylindrical rib, so that no step portion is formed between the insert member and the end portion of the tube portion. In addition, the cylindrical rib can be surely brought into tight contact with the surface of the lid which is the peripheral edge portion of the opening of the insert member on the filler hose side. Hence, sealing property between the tube portion of the filler hose and the inside of the filler neck can be enhanced, so that the fuel supply performance can be improved more over.

Furthermore, the insert member may be installed in the neck portion of the filler hose, and may also be fitted into the neck portion.

According to the above configuration, since the insert member is installed in the filler hose in advance, the insert member can be placed in the inside of the filler neck merely by fitting the filler hose onto the filler neck.

In addition, the insert member may be constructed to include a check valve for opening and closing an inlet of a fuel flow passage on the tank main body side so as to prevent a reverse flow of the fuel.

According to the above configuration, since the check valve is provided to the insert member which is secured to the neck portion of the filler hose, layout and assembling of the check valve can be facilitated.

BRIEF DESCRIPTION OF THE DRAWING

FIGURE is a sectional view showing a structure for connecting a filler tube to a fuel tank according to an embodiment of the present invention.

DESCRIPTION OF THE PREFERRED EMBODIMENTS

An embodiment of the present invention will be explained with reference to FIG. 1 hereinafter.

As shown in FIG. 1, a tank main body 1 is made of appropriate resin material, etc. having oil resistance, heat resistance, and weatherability. The tank main body 1 is integrally molded in terms of blow molding. A filler neck 2 is integrally formed on a side corner portion of the tank main body 1 so as to project from the tank main body 1.

A projected portion 3 which protrudes outward in an annular fashion is formed on an outer peripheral surface of a top end portion of the filler neck 2. The projected portion 3 can prevent a neck portion 8 of a flexible filler hose 7, which will be described later, from being disconnected from the filler neck 2.

A filler tube comprises a main tube body 5 and the filler hose 7.

The main tube body 5 is formed of metal material. One end of the main tube body 5 is connected to a fuel filler port (not shown) provided in an outer surface of a car body. One end portion 7a of the flexible filler hose 7 which is made of rubber, resin, etc. having oil resistance, heat resistance, and weatherability is fitted onto an outer surface of the other end portion 5a of the main tube body 5 and thus connected to the other end 5a.

The main tube body 5 and the filler hose 7 have the inner diameters respectively not to create the clearance between their inner peripheral surfaces and the fuel stream which is supplied from the fuel filler port and then flows through the inside of the main tube body 5 and the filler hose 7. Both the inner diameters of the main tube body 5 and the filler hose 7 are formed to be substantially identical in dimension to each other but small rather than that of the filler neck 2 of the tank main body 1. The other end portion 7b of the filler hose 7 is fitted onto an outer surface of the filler neck 2. On the other end portion 7b of the filler hose 7 is formed the neck portion 8 which has an inner diameter being larger than that of the main tube body 5 to cope with that of the filler neck 2 of the tank main body 1. A portion of the filler hose 7 between the main tube body 5 and the filler neck 2 of the tank main body 1 constitutes a tube portion 7c. The tube portion 7c connects the main tube body 5 to the filler neck 2 and has an inner diameter substantially identical to that of the main tube body 5.

A cylindrical insert 9 serving as an insert member is secured to the inside of the neck portion 8 of the filler hose 7 and inserted inward into the filler neck 2. An inner diameter of the cylindrical insert 9 is formed to be substantially equal to those of the filler hose 7 and the main tube body 5. The cylindrical insert 9 is fitted onto an inner peripheral surface of the filler neck 2. The neck portion 8 of the filler hose 7 is fitted onto an outer peripheral surface of the filler neck 2, whereby the filler neck 2 and the filler hose 7 are connected to each other.

The cylindrical insert 9 is integrally formed of appropriate resin material, which has oil resistance, heat resistance, and weatherability like the tank main body 1, to have a double cylindrical structure. More particularly, the cylindrical insert 9 includes an inner peripheral wall 9a for defining the fuel flow passage, and an outer peripheral wall 9b provided along an outer surface of the inner peripheral wall 9a at a predetermined interval. Consequently, a cylindrical space is created between the inner peripheral wall 9a and the outer peripheral wall 9b. An annular lid 10 made of the same material as the cylindrical insert 9 is secured to a peripheral edge portion of an annular opening of this cylindrical space. As a result, the cylindrical insert 9 is formed to provide a hollow structure. A metal collar 11 is inserted into the cylindrical space along the inside of the outer peripheral wall 9b at a distance from the inner peripheral wall 9a. The cylindrical insert 9 can be reinforced by the metal collar 11 so as to stand a fastening force by a hose clamp 15, which will be described later.

Between the outer peripheral wall 9b and the inner peripheral surface of the neck portion 8 of the filler hose 7 near an outer peripheral portion of the opening of the cylindrical space formed in the cylindrical insert 9, a stepped portion 12 is formed to assure the filler neck 2 a desired clearance to be inserted. This stepped portion 12 abuts to an inner surface of the peripheral wall of the neck portion 8 and thus is supported inward by an elastic force of the peripheral wall of the neck portion 8. For this reason, the cylindrical insert 9 can be held on the inside of the neck portion 8.

A check valve 13 is provided on the opening of the cylindrical insert 9 on the tank main body 1 side to prevent a reverse flow of the fuel.

An annular rib 14 is integrally formed in the neck portion 8 of the filler hose 7 so as to project from an end portion of the tube portion 7c to an inside of the neck portion 8. This annular rib 14 is brought into tight contact with a surface of the annular lid 10 which is positioned on a peripheral edge portion of the opening of the cylindrical insert 9 on the filler hose 7 side.

A fuel flow guide 4 is attached to the inner surface of the filler neck 2 so as to protrude into the tank main body 1. A connection portion of the filler hose 7 and the filler neck 2 and a connection portion of the filler hose 7 and the main tube body 5 can be fastened by the hose clamps 15, 16 respectively.

In the above configuration, both the inner diameters of the main tube body 5 and the filler hose 7 are formed to be substantially identical to each other but smaller than that of the filler neck 2 of the tank main body 1 not to create a clearance between their inner peripheral surfaces and the fuel stream. Such fuel stream is supplied from the fuel filler port (not shown) and then flows through in the main tube body 5 and the filler hose 7. Therefore, the clearance is difficult to be created between the inner peripheral surfaces of the main tube body 5 and the filler hose 7 and the fuel stream flowing through the main tube body 5 and the filler hose 7. Accordingly, it is possible to avoid escape of the vapor fuel from the fuel filler port to the outer air via the clearance, so that the air pollution due to leakage of the vapor fuel upon supply of the fuel can be prevented.

The cylindrical insert 9 having an inner diameter substantially identical to those of the filler hose 7 and the main tube body 5 is positioned on the inside of the neck portion 8 of the filler hose 7. Accordingly, there exists no portion where the inner diameter is largely changed in the fuel supply passage from the main tube body 5 to the filler neck 2, whereby the inner diameter of the fuel supply passage can be made substantially uniform. As a result, generation of turbulent flow of the supplied fuel at the filler neck 2 having the large diameter and reduction in the flow rate of the supplied fuel can be suppressed to their maximum and as a result fuel supply performance can be improved.

In particular, in the present embodiment, the annular rib 14 is formed to protrude from the end portion of the tube portion 7c in the neck portion 8 of the filler hose 7. Hence, even though relative position between the cylindrical insert 9 and the end portion of the tube portion 7c is varied in the neck portion 8, such variation can be absorbed by the annular rib 14. No step and no clearance is thus generated between the cylindrical insert 9 and the end portion of the tube portion 7c. In addition, the annular rib 14 can be brought firmly into tight contact with the surface of the annular lid 10 which is the peripheral edge portion of the opening of the cylindrical insert 9 on the filler hose side. Hence, sealing property between the tube portion 7c of the filler hose 7 and the inside of the filler neck 2 (flow passage in the cylindrical insert 9) can be enhanced, so that the fuel supply performance can be improved further more.

Further, since the cylindrical insert 9 is fitted onto the inside of the neck portion 8 of the filler hose 7, such cylindrical insert 9 can be placed in the inside of the filler neck 2 by merely fitting the filler hose 7 to the filler neck 2.

Furthermore, since the check valve 13 for preventing the reverse flow of the fuel is provided on the opening of the cylindrical insert 9 on the tank main body 2 side, such check valve 13 can be arranged in the fuel supply passage by inserting and installing the cylindrical insert 9 into the neck portion 8 of the filler hose 7. Accordingly, layout and assembling of the check valve 13 can be facilitated.

Moreover, because the cylindrical insert 9 is made of hollow resin, it is of lighter weight. Thus the cylindrical insert 9 is easy in handling when assembled and managed as parts, and advantageous in cost. Besides, since the reinforcing metal collar 11 is provided along the inside of the outer peripheral wall 9b at a distance from the inner peripheral wall 9a which contacts to the fuel, the fuel swelling in the inner peripheral wall 9a is not limited by the metal collar 11, nor is change in shape or expansion of the outer peripheral wall 9b in the wake of the inner peripheral wall 9a due to the fuel swelling limited. As a result, the cylindrical insert 9 can be reinforced by the metal collar 11.

What is claimed is:

1. A structure for connecting a filler tube to a fuel tank, comprising:

a filler neck formed in a tubular shape, projected from an outer surface of a tank main body, connecting an inside of said tank main body to an outside thereof and having an inner diameter which is larger than an inner diameter of said filler tube;

said filler tube including a connection portion unitary with one end of said filler tube fitted onto an outer peripheral surface of said filler neck; and an insert member disposed in said filler neck and including a fuel flow passage connecting said filler tube to said tank main body and having an inner diameter substantially identical to the inner diameter of said filler tube, one end of the insert member being located proximate an open-end of said filler neck.

2. A structure for connecting a filler tube to a fuel tank according to claim 1, wherein said insert member includes a main body and a collar, said main body is formed of resin and includes an inner peripheral wall and an outer peripheral wall, an inner surface of said inner peripheral wall defines said fuel flow passage, said outer peripheral wall is provided along an outer surface of said inner peripheral wall at a distance therefrom, and said collar is formed of metal and inserted into a cylindrical clearance between said inner peripheral wall and said outer peripheral wall so as to be positioned along an inner surface of said outer peripheral wall at a distance from said inner peripheral wall.

3. A structure for connecting a filler tube to a fuel tank according to claim 1, wherein:

said filler tube includes a main tube body and a filler hose, said filler hose comprises a tube portion and said connection portion, the tube portion having an inner diameter substantially identical to the inner diameter of said main tube body, one end of the tube portion is connected to said main tube body, and said connection portion is arranged on the other end of the tube portion.

4. A structure for connecting a filler tube to a fuel tank according to claim 3, wherein said connection portion of said filler hose includes a neck portion and an annular rib, said neck portion is extended outward from an outer peripheral surface of the other end of said tube portion, said filler neck is fitted onto an inner peripheral surface of said neck portion, said annular rib is integrally projected from the other end of said tube portion to an inner side of said neck portion, and said annular rib is positioned to be brought into tight contact with a peripheral portion of an inlet of said insert member on a filler hose side.

5. A structure for connecting a filler tube to a fuel tank according to claim 3, wherein said filler hose and said connection portion are integrally formed.

6. A structure for connecting a filler tube to a fuel tank, comprising:

a filler neck having a tubular shape, projected from an outer surface of a tank main body, for connecting an inside of said tank main body to an outside thereof and having an inner diameter which is larger than an inner diameter of said filler tube;

said filler tube including a connection portion on one of said filler tube fitted onto an outer peripheral surface of said filler neck; and an insert member disposed in said filler neck and including a fuel flow passage connecting said filler tube to said tank main body, said insert member having an inner diameter substantially identical to the inner diameter of said filler tube, and wherein:

said insert member includes a main body and a collar, said main body is formed of resin and includes an inner peripheral wall and an outer peripheral wall, an inner surface of said inner peripheral wall defines said fuel flow passage, said outer peripheral wall is provided along an outer surface of said inner peripheral wall at a distance therefrom, and said collar is formed of metal and is inserted into a cylindrical clearance between said inner peripheral wall and said outer peripheral wall so as to be positioned along an inner surface of said outer peripheral wall at a distance from said inner peripheral wall.

7. A structure for connecting a filler tube to a fuel tank, comprising:

a filler neck formed in a tubular shape, projected from an outer surface of a tank main body, connecting an inside of said tank main body to an outside thereof and having an inner diameter which is larger than an inner diameter of said filler tube;

said filler tube including a connection portion on one end of said filler tube fitted onto an outer peripheral surface of said filler neck; and an insert member disposed in said filler neck and including a fuel flow passage connecting said filler tube to said tank main body and having an inner diameter substantially identical to the inner diameter of said filler tube, and wherein:

said filler tube includes a main tube body and a filler hose, said filler hose comprises a tube portion and said connection portion, the tube portion having an inner diameter substantially identical to the inner diameter of said main tube body, one end of the tube portion is connected to said main tube body, said connection portion is arranged on the other end of the tube portion, said connection portion includes a neck portion and an annular rib, said neck portion is extended outward from an outer peripheral surface of the other end of said tube portion, said filler neck is fitted onto an inner peripheral surface of said neck portion, said annular rib is integrally projected from the other end of said tube portion to an inner side of said neck portion, and said annular rib is positioned to be brought into tight contact with a peripheral portion of an inlet of said inset member on a filler hose side.

8. A structure for connecting a filler tube to a fuel tank according to claim 7, wherein said insert member is installed in said neck portion of said filler hose.

9. A structure for connecting a filler tube to a fuel tank according to claim 8, wherein said insert member is fitted into said neck portion of said filler hose.

10. A structure for connecting a filler tube to a fuel tank according to claim 8, wherein said insert member includes a check valve for opening and closing an inlet of said fuel flow passage on said tank main body side to prevent a reverse flow of fuel.

* * * * *